United States Patent
Park et al.

(10) Patent No.: US 9,400,552 B2
(45) Date of Patent: Jul. 26, 2016

(54) APPARATUS AND METHOD FOR CHECKING GAZE OBJECT

(71) Applicant: Hyundai Motor Company, Seoul (KR)

(72) Inventors: Sung Min Park, Seoul (KR); Seok Beom Lee, Seoul (KR); Hee Jin Ro, Seoul (KR); Dong Hee Seok, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 13/960,390

(22) Filed: Aug. 6, 2013

(65) Prior Publication Data

US 2014/0160011 A1 Jun. 12, 2014

(30) Foreign Application Priority Data

Dec. 12, 2012 (KR) ........................ 10-2012-0144923

(51) Int. Cl.
*G06F 3/13* (2006.01)
*G06F 3/01* (2006.01)

(52) U.S. Cl.
CPC ...................................... *G06F 3/013* (2013.01)

(58) Field of Classification Search
CPC ......... G06F 3/013; G06F 3/012; G06F 3/011; G06F 2203/014; G09G 5/00; B62D 1/046; B60W 50/16; G02B 27/0093; G02B 27/01; G02B 2027/0147; G02B 2027/0165; G02B 27/017; G02B 2027/0178; G02B 27/0179; G02B 2027/0181; G02B 2027/0185

USPC ..................................... 345/156, 7–8; 349/11
See application file for complete search history.

(56) References Cited

U.S. PATENT DOCUMENTS

| | | | |
|---|---|---|---|
| 6,369,794 B1* | 4/2002 | Sakurai et al. | 345/156 |
| 2005/0259153 A1 | 11/2005 | Oka | |
| 2011/0085211 A1* | 4/2011 | King et al. | 358/474 |
| 2011/0169730 A1* | 7/2011 | Sugihara | 345/156 |
| 2012/0139830 A1* | 6/2012 | Hwang et al. | 345/156 |

FOREIGN PATENT DOCUMENTS

| | | |
|---|---|---|
| JP | 06-000162 A | 1/1994 |
| JP | 08-292394 | 11/1996 |
| JP | 2011-133548 A | 7/2011 |
| KR | 10-2000-0056563 A | 9/2000 |
| KR | 10-2006-0048033 A | 5/2006 |
| KR | 10-2010-0038897 A | 4/2010 |
| KR | 2012-0055011 A | 5/2012 |

* cited by examiner

*Primary Examiner* — Lun-Yi Lao
*Assistant Examiner* — Jarurat Suteerawongsa
(74) *Attorney, Agent, or Firm* — McDermott Will & Emery LLP

(57) ABSTRACT

An apparatus for checking a gaze object includes an eye detector configured to detect eyes from a captured image of a user who stares at objects while the objects displayed on a display move at certain frequencies, a frequency converter configured to check a motion of the detected eyes and convert the motion of the eyes into an eye moving frequency, and a discriminating unit configured to compare the eye moving frequency and moving frequencies of the objects and discriminate an object at which the user stares depending upon whether or not the eye moving frequency is identical with the moving frequencies of the objects.

10 Claims, 5 Drawing Sheets

APPARATUS AND METHOD FOR CHECKING GAZE OBJECT

CROSS-REFERENCES TO RELATED APPLICATIONS

This application claims benefit of priority to Korean patent application No. 10-2012-0144923 filed on Dec. 12, 2012, the disclosure of which is hereby incorporated in its entirety by reference.

TECHNICAL FIELD

The present disclosure relates to an apparatus and method for checking a gaze object. More particularly, the present disclosure relates to technology for causing a driver to check a warning light displayed on a display of a vehicle.

BACKGROUND

Various detecting methods for detecting a driver's gaze location in a vehicle have been applied.

Among the detecting methods, one method detects a driver's gaze direction using feature points of a driver's face, for example, locations of eyes, a nose, and a mouse, a facial contour shape, and the like in a driver's facial image, and recognizes a location at which the driver stares based on the detected driver's gaze direction.

However, when objects are disposed on neighboring positions of a display, it is difficult to check an object at which the driver stares only using the driver's gaze direction. Therefore, a need exists for a method for identifying whether the driver stares at a specific object.

When a plurality of warning lights are displayed in a display panel of a vehicle, the driver may check an abnormal symptom of the vehicle through the warning lights displayed in the display panel. In this case, a need exists for technology for identifying whether or not the driver checks the warning lights.

SUMMARY

Various aspects of the present disclosure have been made in view of the above problems, and provide an apparatus and method for checking a gaze object capable of checking whether or not a user stares at an object displayed on a display.

Various aspects of the present disclosure provide an apparatus and method for checking a gaze object capable of causing a driver to check warning lights displayed on a display panel of a vehicle.

Various aspects of the present disclosure provide an apparatus and method for checking a gaze object capable of checking whether or not to stare at an object using an eye moving frequency calculated from an eye image.

An aspect of the present disclosure encompasses an apparatus for checking a gaze object. The apparatus may include: an eye detector configured to detect eyes from a captured image of a user who stares at objects while the objects displayed on a display move at certain frequencies; a frequency converter configured to check a motion of the detected eyes and convert the motion of the eyes into an eye moving frequency; and a discriminating unit configured to compare the eye moving frequency and moving frequencies of the objects and discriminate an object at which the user stares depending upon whether or not the eve moving frequency is identical with the moving frequencies of the objects.

The frequency converter may perform a Fourier transform on the motion of the eyes to calculate the eye moving frequency.

The frequency converter may calculate the eye moving frequency corresponding to the motion of the eyes using any one algorithm of fast Fourier transform (FFT) and unequally spaced FFT.

The eye detector may detect the eyes from the image using any one algorithm selected from the group consisting of Adaboost, Template matching, active appearance model (AAM) and active shape model (ASM).

The apparatus may further include a display controller configured to control a warning light which corresponds to the object that the user stares at, to be turned off on the display according to a pre-discrimination result.

Another aspect of the present disclosure relates to a method for checking a gaze object. The method may include: detecting eyes from a captured image of a user who stares at objects while the objects displayed on a display move at certain frequencies; checking a motion of the detected eyes and converting the motion of the eyes into an eye moving frequency; and comparing the eye moving frequency with moving frequencies of the objects and discriminate an object at which the user stares depending upon whether or not the eye moving frequency is identical with the moving frequencies of the objects.

The converting may include performing a Fourier transform on the motion of the eyes to calculate the eye moving frequency.

The converting may calculate the eye moving frequency corresponding to the motion of the eyes using any one algorithm of FFT and unequally spaced FFT.

The detecting eyes may include detecting the eyes from the image using any one algorithm selected from the group consisting of Adaboost, Template matching, active appearance model (AAM) and active shape model (ASM).

The method may further include controlling a warning light, which corresponds to an object that the user stares at, to be turned off on the display according to a discrimination result.

According to the exemplary embodiments of the present disclosure, the apparatus and method for checking a gaze object are capable of accurately determining whether or not a driver checks warning lights displayed on a display by checking whether or not to stare at an object on the display using an eye moving frequency calculated from an eye image of the user and thus, controlling display of warning light.

Further, the display control is performed according to where or not the driver checks the warning lights and when the user does not check the warning lights, the apparatus and method cause a driver to guide so that a vehicle gets A/S.

The systems and methods of the present disclosure have other features and advantages which will be apparent from or are set forth in more detail in the accompanying drawings, which are incorporated herein, and the following Detailed Description, which together serve to explain certain principles of the present inventive concept.

DETAILED DESCRIPTION

Figure 1:
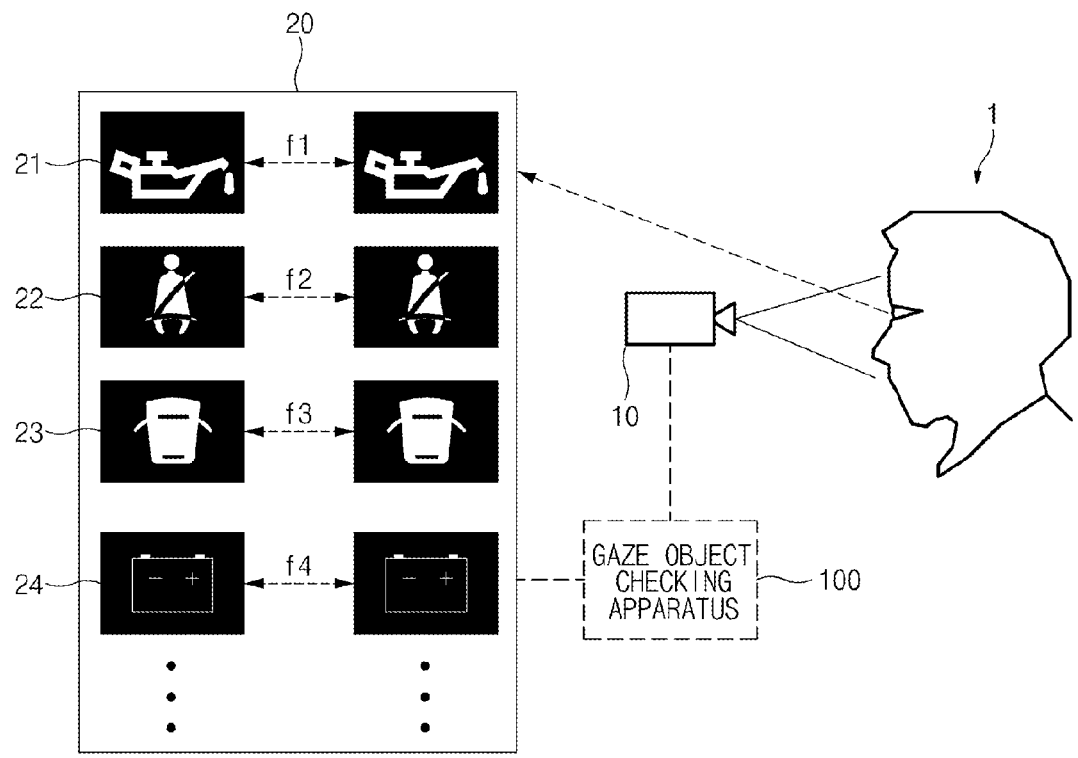
FIG. 1 is a reference view explaining an operation principle of an apparatus for checking a gaze object according to an exemplary embodiment of the present disclosure.

Reference will now be made in detail to various embodiments of the present disclosure, examples of which are illustrated in the accompanying drawings and described below. Like reference numerals in the drawings denote like elements. When it is determined that detailed description of a configuration or a function in the related disclosure interrupts understandings of embodiments in description of the embodiments of the disclosure, the detailed description will be omitted.

It should be understood that in a detail description below, as suffixes for configuration elements, 'module' and 'unit' are assigned or used together, for clarity, but there is no distinctive meaning or function between them per se.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

FIG. 1 is a reference view explaining an operation principle of an apparatus for checking a gaze object according to an exemplary embodiment of the present disclosure.

An apparatus for checking a gaze object (hereinafter, referred to as a gaze object checking apparatus) according to an exemplary embodiment of the present disclosure calculates an eye moving frequency according a motion of eyes of a user who stares at a moving object and checks the object at which the user stares while the object displayed on a display at a certain frequency.

In particular, the gaze object checking apparatus according to an exemplary embodiment of the present disclosure checks whether or not the driver stares at an object displayed on a display panel of a vehicle, for example, a cluster, a head up display (HUD), an audio video navigation (AVN), and the like.

Here, the object displayed on the display may correspond to a warning light. It is to be checked whether or not the driver stares at the object. Hereinafter, description is made on the assumption that the object is the warning light. However, the object is not limited thereto.

Referring to FIG. 1, a gaze object checking apparatus 100 causes a plurality of warning lights displayed in a display 20 of a vehicle to periodically move at a certain frequency.

As one example, an engine oil warning light 21, a safety belt unfastening warning light 22, a door open warning light 23, and a battery charging warning light 24 may be displayed on the display 20 of the vehicle. In addition, a brake warning light, an air back warning light, an electric power steering warning light, a cooling water temperature warning light, and the like may be displayed on the display of a vehicle.

Here, a plurality of warning lights 21 to 24 displayed on the display 20 of the vehicle are configured to have unique moving frequencies f1 to f4, respectively and periodically move on the display 20 according to the set moving frequencies f1 to f4. For example, the engine oil warning light 21 moves at a frequency of f1, the safety belt unfastening warning light 22 moves at a frequency of f2, the door open warning light 23 moves at a frequency of f3, and the battery charging warning light 24 moves at a frequency of f4.

As illustrated in FIG. 1, the engine oil warning light 21, the safety belt unfastening warning light 22, the door open warning light 23, and the battery charging warning light 24 move to a horizontal direction. However, the moving direction is not limited thereto and the engine oil warning light 21, the safety belt unfastening warning light 22, the door open warning light 23, and the battery charging warning light 24 may move to a vertical direction, to a diagonal direction, or to a curved direction.

On the other hand, a camera 10 is included in the vehicle and captures an image of a driver 1, specifically, a facial image. The camera 10 transmits a captured image to the gaze object checking apparatus 100. The gaze object checking apparatus 100 detects eyes of the driver's 1 from the image captured by the camera 10 to check a motion of the eyes, detects an eye moving frequency according to the motion of the eyes of the driver 1, and compares the eye moving frequency with the moving frequencies f1 to f4 of the warning lights 21 to 24 to check whether or not the driver 1 stares at the warning lights 21 to 24 moving on the display 20.

An operation of the gaze object checking apparatus 100 will be described in more detail below with reference to FIG. 2.

Figure 2:
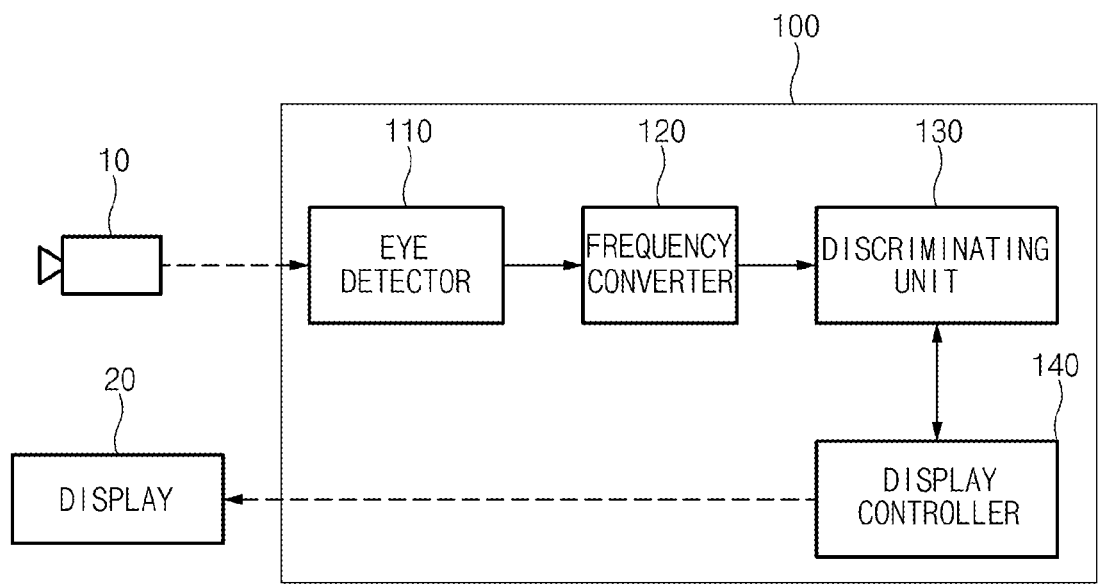
FIG. 2 is a block diagram illustrating a configuration of an apparatus for checking a gaze object according to an exemplary embodiment of the present disclosure.

FIG. 2 is a block diagram illustrating a configuration of a gaze object checking apparatus according to an exemplary embodiment. Referring to FIG. 2, the gaze object checking apparatus 100 includes an eye detector 110, a frequency converter 120, a discriminating unit 130, and a display controller 140.

First, the eye detector 110 receives a captured image of the driver from a camera included in a vehicle 1. At this time, the eye detector 110 analyzes the captured image to detect eyes of the driver.

The eye detector 110 may detect the eyes from the captured image using at least one algorithm, selected from the group consisting of Adaboost, Template matching, active appearance model (AAM) and active shape model (ASM). In addition to the above-described algorithms, any algorithm used for the eye detection may be applied. The above-described algorithms are generally used to detect eyes from an image and thus detailed description thereof will be omitted.

The eye detector 110 transmits a detection result of the eyes detected from the captured image to the frequency converter 120.

When the detection result of the eyes is received from the eye detector 110, the frequency converter 120 recognizes a motion of the eyes from the detection result of the eye for a certain period of time. At this time, the frequency converter 120 calculates an eye moving frequency from the recognized motion of the eyes.

Here, the frequency converter 120 performs Fourier transform (FT) on the recognized motion of the eyes and calculates the eye moving frequency. As one example, the frequency converter 120 may calculate the eye moving frequency corresponding to the motion of the eyes using any one frequency converting algorithm selected from the group consisting of FT, FFT, and Unequally spaced FFT. In addition to the above-described algorithms, any algorithm used in frequency conversion for a motion may be applied. The above-described algorithms are generally used in frequency conversion for a motion and thus detailed description thereof will be omitted.

The frequency convertor 120 transmits information on the eye moving frequency calculated corresponding to the motion of the eyes to the discriminating unit 130.

The discriminating unit 130 receives moving frequencies for the warning lights displayed on the display from the display controller 140. When the eye moving frequency is received from the frequency converter 120, the discriminating unit 130 compares the received eye moving frequency with the moving frequencies.

When the user stares at any one warning light moving at a certain frequency, the eye moving frequency corresponding to the motion of the eyes of the driver is identical to the moving frequency of the warning light at which the driver stares. Although an error occurs to a certain degree in respective frequency values when processes are performed, for clarity, the exemplary embodiment will be described on the assumption that the moving frequency of the warning light at which the driver stares is identical with the eye moving frequency.

When the moving frequency of the warning light which is identical with the eye moving frequency, the discriminating unit 130 discriminates that the driver stares at the corresponding warning light.

The discriminating unit 130 transmits a discrimination result of whether or not the driver states at the warning light to the display controller 140. Here, the discriminating unit 130 may transmit information on the discriminated warning light at which the driver stares, for moving frequency information for the corresponding warning light together with the discrimination result.

The display controller 140 sets moving frequencies for the plurality warning lights displayed on the display of the vehicle and controls the plurality of warning lights displayed on the display to move at the set moving frequencies.

The display controller 140 transmits the set moving frequencies for the plurality of warning lights to the discriminating unit 130 and controls display of the corresponding warning light according to the discrimination result inputted from the discriminating unit 130. As an example, when it is determined that the driver stares at the engine oil warning light according to the discrimination result from the discriminating unit 130, the display controller 140 may control the engine oil warning light displayed on the display to be turned off.

When it is determined that the driver does not stare at the warning lights according to the discrimination result from the discriminating unit 130, the display unit 140 may control display types of the warning lights displayed on the display such as color, a size, and a shape to be changed or control a separate warning sound to be output.

Figure 3:
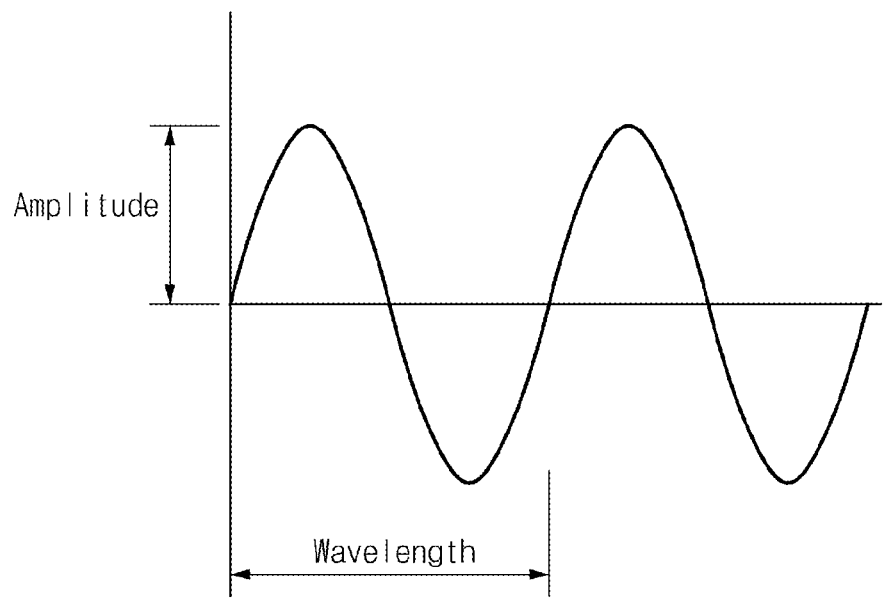
FIGS. 3 and 4 are illustrative views illustrating frequency waveforms applied to an exemplary embodiment of the present disclosure.
Figure 4:
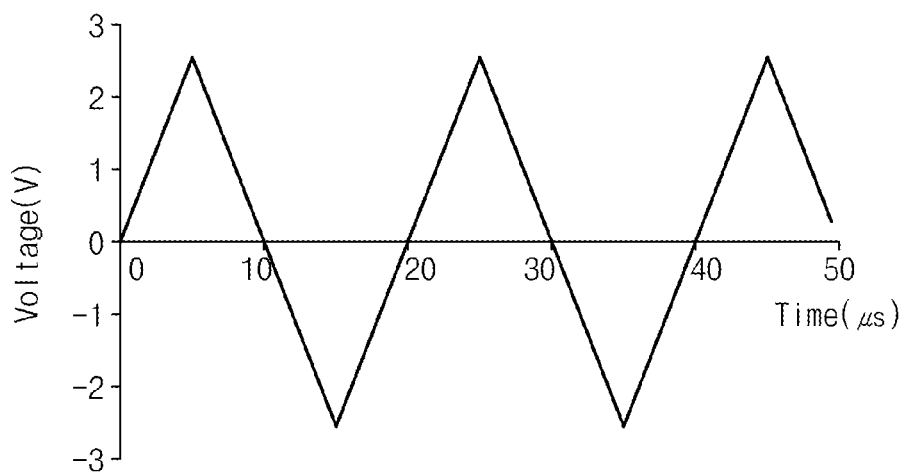

FIGS. 3 and 4 illustrate frequency waveforms applied to an exemplary embodiment of the present disclosure. Specifically, FIGS. 3 and 4 illustrate moving frequencies of warning lights displayed on a display.

The moving frequencies of the warning lights displayed on the display may have a sinusoidal waveform as illustrated in FIG. 3 or a triangular waveform as illustrated in FIG. 4, but the waveforms of the moving frequencies are not limited thereto. In addition to the above-described waveforms, the moving frequencies of the warning lights may have a flickering type waveform and the like.

An operation of the gaze object checking apparatus having the above-described configuration according to an exemplary embodiment of the present disclosure will be described.

Figure 5:
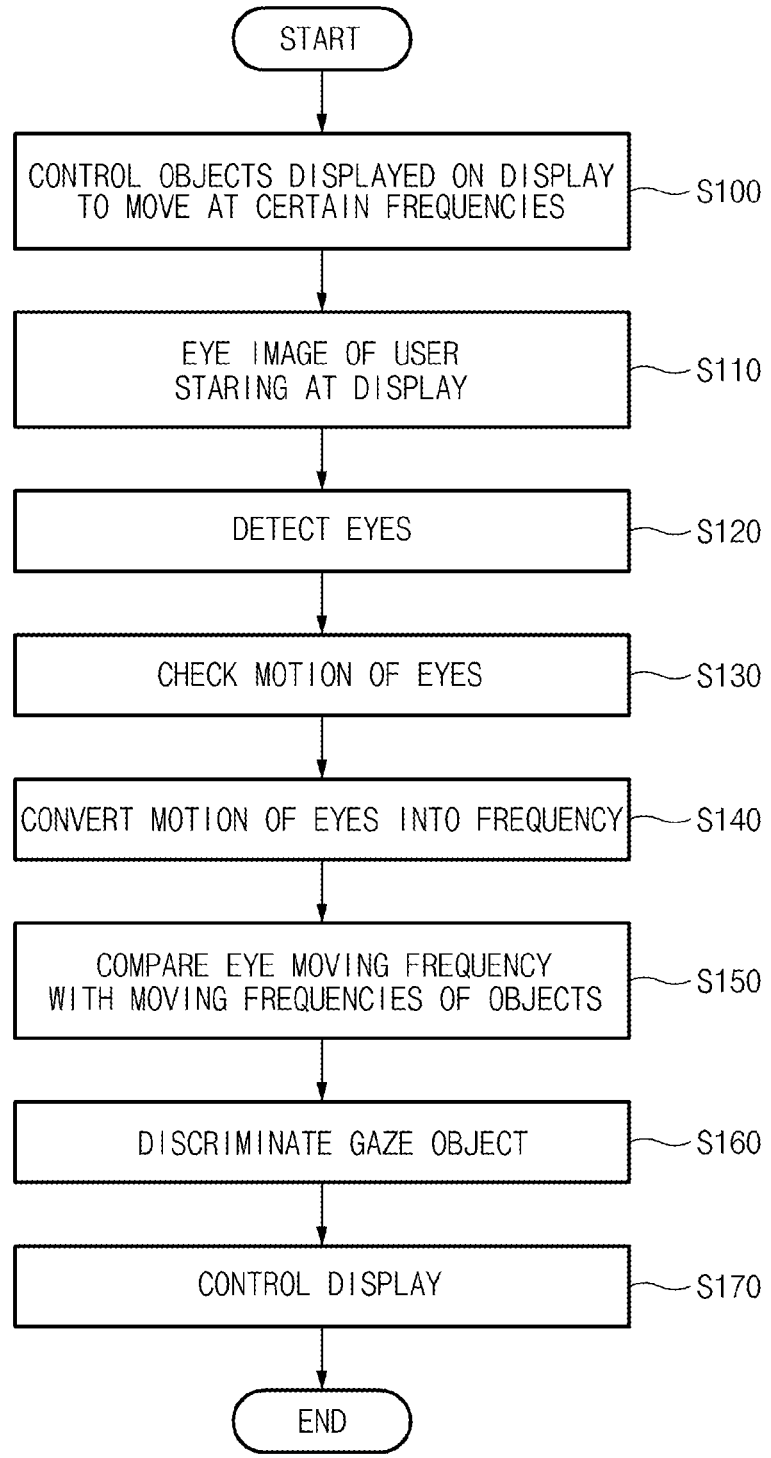
FIG. 5 is a flowchart illustrating an operation for a method for checking a gaze object.

FIG. 5 is a flowchart illustrating an operation for a method for checking a gaze object according to an exemplary embodiment of the present disclosure. Referring to FIG. 5, the gaze object checking apparatus controls objects displayed on a display to be move preset specific frequencies (S100).

The gaze object checking apparatus acquires an eye image of a user staring at the display from a camera (S110) and analyzes the eye image acquired in the step S110 to detect eyes (S120).

Then, the gaze object checking apparatus checks a motion of the eyes detected in step S120, converts the motion of the eyes into a frequency (S140), and calculates an eye moving frequency for the motion of the eyes of the driver.

The gaze object checking apparatus compares the moving frequencies of the objects moving in the step S100 with the eye moving frequency calculated in the step S140 (S150), and discriminates an object at which the user stares according to a comparison result in the step S150 (S160). At this time, the gaze object checking apparatus controls the display/non-display of the warning lights displayed on the display according to a discriminating result in step S160 (S170).

The foregoing descriptions of specific exemplary embodiments of the present disclosure have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present disclosure, as well as various alternatives and modifications thereof. It is intended that the scope of the inventive concept be defined by the Claims appended hereto and their equivalents.

What is claimed is:

1. An apparatus for checking a gaze object, the apparatus comprising:
   a display controller configured to set unique moving frequencies for a plurality of warning lights displayed on a display of a vehicle and control the plurality of warning lights displayed on the display to move at the set unique moving frequencies;
   an eye detector configured to detect eyes from a captured image of a user who stares at the display while the plurality of warning lights move at the set unique moving frequencies on the display;
   a frequency converter configured to check a motion of the detected eyes and calculate an eye moving frequency corresponding to the motion of the eyes; and
   a discriminator configured to receive the set unique moving frequencies to compare the eye moving frequency with the set unique moving frequencies and to discriminate a corresponding warning light at which the user stares depending upon whether or not the eye moving frequency is identical with the set unique moving frequencies.

2. The apparatus of claim 1, wherein the frequency converter performs a Fourier transform on the motion of the eye to calculate the eye moving frequency.

3. The apparatus of claim 1, wherein the frequency converter calculates the eye moving frequency corresponding to the motion of the eyes using any one algorithm of fast Fourier transform (FFT) and unequally spaced FFT.

4. The apparatus of claim 1, wherein the eye detector detects the eyes from the captured image using any one algorithm selected from the group consisting of Adaboost, Template matching, active appearance model (AAM) and active shape model (ASM).

5. The apparatus of claim 1, wherein the display controller controls the plurality of warning lights that the user stares at, to be turned off on the display according to a pre-discrimination result.

6. A method for checking a gaze object, the method comprising steps of:
setting unique moving frequencies for a plurality warning lights displayed on a display of a vehicle;
controlling the plurality of warning lights displayed on the display to move at the set unique moving frequencies;
detecting eyes from a captured image of a user who stares at display while the plurality of warning lights move at the set unique moving frequencies on the display;
checking a motion of the detected eyes and calculating an eye moving frequency corresponding to the motion of the eyes; and
comparing the eye moving frequency with the set unique moving frequencies and discriminating a corresponding warning light at which the user stares depending upon whether or not the eye moving frequency is identical with the set unique moving frequencies.

7. The method of claim 6, wherein the converting includes performing a Fourier transform on the motion of the eyes to calculate the eye moving frequency.

8. The method of claim 6, wherein the step of converting includes calculating the eye moving frequency corresponding to the motion of the eyes using any one algorithm of FFT and unequally spaced FFT.

9. The method of claim 6, wherein the step of detecting the eyes includes detecting the eyes from the image using any one algorithm selected from the group consisting of Adaboost, Template matching, active appearance model (AAM) and active shape model (ASM).

10. The method of claim 6, further comprising controlling the warning light that the user stares at, to be turned off on the display according to a discrimination result.

* * * * *